United States Patent
Yan et al.

(10) Patent No.: US 12,194,436 B2
(45) Date of Patent: Jan. 14, 2025

(54) WATER ABSORBENT RESIN AND WATER STOP MATERIAL

(71) Applicant: SUMITOMO SEIKA CHEMICALS CO., LTD., Hyogo (JP)

(72) Inventors: Xinlei Yan, Himeji (JP); Masahiro Murakami, Himeji (JP)

(73) Assignee: SUMITOMO SEIKA CHEMICALS CO., LTD., Hyogo (JP)

( * ) Notice: Subject to any disclaimer, the term of this patent is extended or adjusted under 35 U.S.C. 154(b) by 657 days.

(21) Appl. No.: 17/599,283

(22) PCT Filed: Mar. 27, 2020

(86) PCT No.: PCT/JP2020/013908
§ 371 (c)(1),
(2) Date: Sep. 28, 2021

(87) PCT Pub. No.: WO2020/203723
PCT Pub. Date: Oct. 8, 2020

(65) Prior Publication Data
US 2022/0184579 A1    Jun. 16, 2022

(30) Foreign Application Priority Data

Mar. 29, 2019   (JP) .................................. 2019-069054

(51) Int. Cl.
 *B01J 20/26*   (2006.01)
 *B01J 20/28*   (2006.01)
 (Continued)

(52) U.S. Cl.
 CPC ....... *B01J 20/267* (2013.01); *B01J 20/28016* (2013.01); *B01J 20/3085* (2013.01); *C08F 20/06* (2013.01); *C08F 2810/20* (2013.01)

(58) Field of Classification Search
 None
 See application file for complete search history.

(56) References Cited

U.S. PATENT DOCUMENTS

| | | |
|---|---|---|
| 4,497,930 A | 2/1985 | Yamasaki et al. |
| 2006/0194055 A1 | 8/2006 | Matsuda et al. |

(Continued)

FOREIGN PATENT DOCUMENTS

| | | |
|---|---|---|
| EP | 2 387 981 A1 | 11/2011 |
| EP | 2 765 144 A1 | 8/2014 |

(Continued)

OTHER PUBLICATIONS

Third Party Observation filed Jul. 28, 2021 for the International Application No. PCT/JP2020/013908.
(Continued)

*Primary Examiner* — Fred M Teskin
(74) *Attorney, Agent, or Firm* — Sughrue Mion, PLLC (57) ABSTRACT

A water-absorbent resin includes a partially neutralized polyacrylic acid having a crosslinked structure and has a swelling height of 3.5 mm/0.5 g or more with respect to 3.3 mass % salt water, as determined under the following measurement conditions: 0.5 g of water-absorbent resin particles are sprayed over a circular concave cup having a height of 30 mm and an inner diameter of 80.5 mm; a nonwoven fabric is spread thereon; a circular convex cylinder having an outer diameter of 80 mm is placed on the nonwoven fabric, and 55 g of 3.3 mass % salt water at 20° C. is poured into the circular concave cup; one minute after the start of water absorption by the water-absorbent resin particles, the degree that the circular convex cylinder is pushed up due to swelling of the water-absorbent resin particles is measured as a salt water swelling height of the water-absorbent resin.

3 Claims, 1 Drawing Sheet

(51) Int. Cl.
 *B01J 20/30* (2006.01)
 *C08F 20/06* (2006.01)

(56) References Cited

U.S. PATENT DOCUMENTS

| | | |
|---|---|---|
| 2009/0182092 A1 | 7/2009 | Yokoyama et al. |
| 2012/0295103 A1 | 11/2012 | Kikuno et al. |
| 2013/0260151 A1 | 10/2013 | Heguri et al. |
| 2014/0127510 A1 | 5/2014 | Handa et al. |
| 2015/0158015 A1 | 6/2015 | Tanimura et al. |
| 2021/0022932 A1 | 1/2021 | Ito et al. |
| 2021/0023530 A1 | 1/2021 | Ito et al. |

FOREIGN PATENT DOCUMENTS

| | | |
|---|---|---|
| JP | 2009-132755 A | 6/2009 |
| JP | 2016-035060 A | 3/2016 |
| JP | 2017-179382 A | 10/2017 |
| WO | 2004/083284 A1 | 9/2004 |
| WO | 2007/126002 A1 | 11/2007 |
| WO | 2011/065368 A1 | 6/2011 |
| WO | 2012/053121 A1 | 4/2012 |
| WO | 2013/125279 A1 | 1/2013 |
| WO | 2013/018571 A1 | 2/2013 |
| WO | 2013/128978 A1 | 9/2013 |
| WO | 2019/189445 A1 | 10/2019 |
| WO | 2019/189485 A1 | 10/2019 |

OTHER PUBLICATIONS

International Search Report of PCT/JP2020/013908 dated Jun. 9, 2020 [PCT/ISA/210].

WATER ABSORBENT RESIN AND WATER STOP MATERIAL

TECHNICAL FIELD

The present invention relates to a water-absorbent resin, and a water-blocking material.

BACKGROUND ART

In recent years, water-absorbent resins have been widely used in various fields, including hygienic materials such as disposable diapers and sanitary napkins; agricultural and horticultural materials such as water-retaining agents and soil conditioners; and industrial materials such as water-blocking agents, and agents for preventing dew condensation. Examples of water-absorbent resins used for such applications include hydrolysates of starch-acrylonitrile graft copolymers, neutralized products of starch-acrylic acid graft polymers, saponified products of vinyl acetate-acrylic ester copolymers, partially neutralized polyacrylic acid, and the like. Commonly required properties of water-absorbent resin particles include high water absorption, an excellent water absorption rate, high swelling capacity, and an appropriate median particle size in accordance with applications.

Among these, water-blocking materials for cables are, for example, formed of two or more liquid-permeable sheets and water-absorbent resin particles that are fixed between the liquid-permeable sheets, optionally using an adhesive and the like. With the development of the electrical industry and communication industry, the demand for such water-blocking materials has been increasing. Water-blocking materials for cables are used to wrap the cores of cables, such as power cables and optical communication cables, and thereby protect the cores. Further, the outside of the water-blocking materials is covered with a material such as rubber, thus forming cables. In power cables or optical communication cables, if the outer material is deteriorated and if moisture that leaks in through generated cracks has reached the core of the cables, it will lead to decreased electric power and cause communication noise. Therefore, to prevent these problems, water-blocking materials absorb water and swell to increase the pressure in cables, thereby preventing the water from reaching the core of the cables.

Water-absorbent resins for use in a water-blocking material for power cables and optical communication cables are required to have high absorption performance to absorb an absorption liquid with a high salt concentration, such as seawater. For example, Patent Literature (PTL) 1 discloses forming a water-blocking material or the like by using amorphous water-absorbent resin particles that have a specific volume average particle size and a specific coefficient of variation, and that contain copolymer particles with an acrylic acid monomer and a monomer having sulfonic acid. Using such a water-absorbent resin as a water-blocking material enhances the water-absorption performance with respect to salt water or the like, and salt resistance.

CITATION LIST

Patent Literature

PTL 1: JP2017-179382A

SUMMARY OF INVENTION

Technical Problem

However, water-absorbent resins used in conventional water-blocking materials do not have sufficient salt water-absorption performance; therefore, it may be difficult for such water-absorbent resins to find application as water-blocking materials for cables that are used in coastal areas, seawater, etc. Specifically, conventional water-absorbent resins do not have sufficient swelling performance with respect to salt water (e.g., water absorption amount and water absorption rate), and thus have a poor seawater-blocking effect. Accordingly, there was leeway for improvement in application to water-blocking materials, such as cables that require blocking of seawater in coastal areas.

The present invention was made in view of the above. An object of the present invention is to provide a water-absorbent resin that has excellent water-absorption performance with respect to salt water; a water-blocking agent including the water-absorbent resin; and a method for producing the water-absorbent resin.

Solution to Problem

As a result of diligent research to achieve the above object, the present inventors found that the water-blocking effect is greatly influenced by to what degree the water-absorbent resin swells in a short period of time (in particular, 1 minute) after the start of salt water absorption by the water-absorbent resin. The inventors further found that the above object can be achieved by adjusting the salt water swelling height as measured by a predetermined measurement method to a specific range one minute after the start of the water absorption, and thereby accomplished the present invention.

Specifically, the present invention encompasses, for example, the subjects described in the following items.

Item 1

A water-absorbent resin including a partially neutralized polyacrylic acid having a crosslinked structure, and having a swelling height of 3.5 mm/0.5 g or more with respect to 3.3 mass % salt water, as determined under the following measurement conditions.

Measurement Conditions for Salt Water Swelling Height 0.5 g of water-absorbent resin particles are sprayed over a circular concave cup having a height of 30 mm and an inner diameter of 80.5 mm. A nonwoven fabric is spread thereon. A circular convex cylinder having an outer diameter of 80 mm is placed on the nonwoven fabric, and 55 g of 3.3 mass % salt water at 20° C. is poured into the circular concave cup. One minute after the start of water absorption by the water-absorbent resin particles, the degree that the circular convex cylinder is pushed up due to swelling of the water-absorbent resin particles is measured as a salt water swelling height of the water-absorbent resin.

Item 2

A water-blocking material including the water-absorbent resin of Item 1.

Item 3

A method for producing a water-absorbent resin, including:

step 1 of subjecting a monomer component containing acrylic acid and a salt thereof to reversed-phase suspension polymerization, and then drying the resulting polymer to obtain a partially neutralized polyacrylic acid; and     step 2 of mixing the polyacrylic acid with a post-crosslinking agent to post-crosslink the polyacrylic acid,     wherein in step 1, the drying is performed so that the polyacrylic acid has a water content of 10 to 30 mass %; and in step 2, the post-crosslinking agent is used in an amount of 0.20 mmol or more per mole of the total amount of the monomer component.

Advantageous Effects of Invention

The water-absorbent resin according to the present invention has excellent water-absorption performance with respect to salt water. The method for producing a water-absorbent resin according to the present invention can easily produce a water-absorbent resin having excellent water-absorption performance with respect to salt water.

DESCRIPTION OF EMBODIMENTS

Embodiments of the present invention are described in detail below. In the numerical ranges described in stages in the present specification, the upper or lower limit of the numerical range in one stage can be arbitrarily combined with the upper or lower limit of the numerical range in another stage. In the numerical range described herein, the upper or lower limit of the numerical range may be replaced by the value shown in the Examples, or with a value that can be unambiguously derived from the Examples. In the present specification, numerical values connected by "to" mean a numerical range including the numerical values before and after "to" as the lower and upper limits.

1. Water-Absorbent Resin

The water-absorbent resin of the present invention includes a partially neutralized polyacrylic acid. The polyacrylic acid has a crosslinked structure. The swelling height of the water-absorbent resin with respect to 3.3 mass % salt water, as determined under the following measurement conditions, is 3.5 mm/0.5 g or more.

Measurement Conditions for Salt Water Swelling Height

Water-absorbent resin particles in an amount of 0.5 g are sprayed over a circular concave cup having a height of 30 mm and an inner diameter of 80.5 mm. A nonwoven fabric is spread thereon. A circular convex cylinder having an outer diameter of 80 mm is placed on the nonwoven fabric, and 55 g of 3.3 mass % salt water at 20° C. is poured into the circular concave cup. One minute after the start of water absorption by the water-absorbent resin particles, the degree that the circular convex cylinder is pushed up due to swelling of the water-absorbent resin particles is measured as the salt water swelling height of the water-absorbent resin.

In the present invention, the more detailed conditions for measurement of the salt water swelling height of the water-absorbent resin are as described below in section "Method for Measuring Salt Water Swelling Height of the Water-Absorbent Resin" in the Examples.

The water-absorbent resin of the present invention has a swelling height of 3.5 mm/0.5 g or more with respect to 3.3 mass % salt water (salt water swelling height), and thus has excellent water-absorption performance with respect to salt water. Specifically, the salt water absorption amount and the salt water absorption rate of the water-absorbent resin of the present invention are both high.

The swelling height with respect to 3.3 mass % salt water as measured under the above-mentioned measurement conditions is hereinafter abbreviated as "salt water swelling height H."

The salt water swelling height H of the water-absorbent resin of the present invention (hereinafter simply referred to as "the water-absorbent resin") is preferably 3.7 mm/0.5 g or more, more preferably 3.9 mm/0.5 g or more, even more preferably 4.0 mm/0.5 g or more, and particularly preferably 4.1 mm/0.5 g or more. The salt water swelling height H can be 10.0 mm/0.5 g or less, 8.0 mm/0.5 g or less, 6.0 mm/0.5 g or less, or 5.0 mm/0.5 g or less.

The method of adjusting the salt water swelling height H of the water-absorbent resin is not particularly limited, and various methods can be used. For example, the swelling rate height H of the water-absorbent resin can be controlled by adjusting the degree of crosslinking of the water-absorbent resin. As another means, the salt water swelling height H can be adjusted to the desired range by selecting the water content of the partially neutralized polyacrylic acid before post-crosslinking after obtaining the partially neutralized polyacrylic acid by reversed-phase suspension polymerization, the amount of post-crosslinking agent for use, the type of surfactant (emulsifier) for use in the reversed-phase suspension polymerization, and the shape of the water-absorbent resin in the production of the water-absorbent resin as described below.

The value of the water absorption capacity of the water-absorbent resin with respect to salt water is not particularly limited. For example, the water absorption capacity of the water-absorbent resin with respect to salt water is preferably 40 g/g or more, more preferably 42 g/g or more, even more preferably 45 g/g or more, and particularly preferably 47 g/g or more. In the present specification, the water absorption capacity of the water-absorbent resin with respect to salt water is measured by the method described below in section "Method for Measuring Salt Water Absorption Capacity of Water-Absorbent Resin Particles" in the Examples.

The water absorption rate of the water-absorbent resin with respect to salt water is not particularly limited. For example, the water absorption of the water-absorbent resin with respect to salt water is 50 seconds or less, more preferably 30 seconds or less, even more preferably 10 seconds or less, and particularly preferably 7 seconds or less. In the present specification, the water absorption rate of the water-absorbent resin with respect to salt water is measured in accordance with the method described in section "Method for Measuring Salt Water Absorption Rate of Water-Absorbent Resin Particles" in the Examples below.

The water-absorbent resin can have various compositions, structures, etc., as long as it contains a partially neutralized polyacrylic acid and the partially neutralized polyacrylic acid has a crosslinked structure. Such a partially neutralized polyacrylic acid can be easily produced, for example, by using the reversed-phase suspension polymerization described below.

The partially neutralized polyacrylic acid has a structure in which some of the acrylic acid units that make up polyacrylic acid are neutralized. In the partially neutralized polyacrylic acid, carboxy groups of acrylic acid units are neutralized to form a salt. In the present specification, the "partially neutralized polyacrylic acid" may be referred to as "polymer A."

The salts of polymer A may be of any kind. Examples include alkali metal salts, ammonium salts, and the like.

Examples of alkali metal salts include sodium salts, potassium salts, and the like. Polymer A particularly preferably has a sodium salt.

When acrylic acid is neutralized, the degree of neutralization is not particularly limited. For example, from the viewpoint that the resulting water-absorbent resin can easily attain the desired salt water swelling height H, the amount of acrylic acid salt is usually preferably 10 to 100 mol %, and more preferably 30 to 80 mol %, based on the total number of moles of all the monomer components that constitute polymer A.

Polymer A can contain monomer units other than the acrylic acid unit and acrylic acid salt, as long as the effect of the present invention is not impaired. When polymer A contains other monomer units, the percentage of content of the other monomer units is 5 mol % or less, preferably 3 mol % or less, more preferably 1 mol % or less, even more preferably 0.5 mol % or less, and particularly preferably 0.1 mol % or less, relative to all the monomer components that constitute polymer A. Most preferably, polymer A is formed only of the acrylic acid unit and acrylic acid salt unit.

Polymer A can have a structure crosslinked by the post-crosslinking agent described below. Since polymer A has a structure crosslinked with a post-crosslinking agent, the water-absorbent resin has an increased crosslinking density near the surface thereof. Polymer A can also have a structure crosslinked with the internal-crosslinking agent described below, in addition to a structure crosslinked with the post-crosslinking agent. Alternatively, Polymer A can have a structure crosslinked with an intermediate crosslinking agent in place of, or in addition to, a structure crosslinked with an internal-crosslinking agent. Examples of internal-crosslinking agents and intermediate crosslinking agents are described in detail below in section "2. Method for Producing Water-Absorbent Resin."

In the present specification, the crosslinking agent used to crosslink the interior of polymer A is referred to as an "internal-crosslinking agent." The crosslinking agent used after particles of polymer A (partially neutralized polyacrylic acid particles) are formed, for example, to increase the crosslinking density near the surface of the particles, is referred to as a "post-crosslinking agent." Further, the crosslinking agent used to provide further crosslinking inside the particles after polymerization and before drying is referred to as an intermediate crosslinking agent. Examples of internal-crosslinking agents and intermediate crosslinking agents are described in detail below in section "2. Method for Producing the Water-Absorbent Resin."

The post-crosslinking agent for use can be a compound that has two or more reactive functional groups. The post-crosslinking agent can be of any kind; and can be selected, for example, from a wide range of known post-crosslinking agents used to produce water-absorbent resins. Specific examples of the post-crosslinking agent include polyols, such as ethylene glycol, propylene glycol, 1,4-butanediol, trimethylolpropane, glycerol, polyoxyethylene glycol, polyoxypropylene glycol, and polyglycerol; polyglycidyl compounds, such as (poly)ethylene glycol diglycidyl ether, (poly)glycerol diglycidyl ether, (poly)glycerol triglycidyl ether, trimethylolpropane triglycidyl ether, (poly)propylene glycol polyglycidyl ether, and (poly)glycerol polyglycidyl ether; haloepoxy compounds, such as epichlorohydrin, epibromohydrin, and α-methyl epichlorohydrin; isocyanate compounds, such as 2,4-tolylene diisocyanate and hexamethylene diisocyanate; oxetane compounds, such as 3-methyl-3-oxetane methanol, 3-ethyl-3-oxetane methanol, 3-butyl-3-oxetane methanol, 3-methyl-3-oxetane ethanol, 3-ethyl-3-oxetane ethanol, and 3-butyl-3-oxetane ethanol; oxazoline compounds, such as 1,2-ethylene bis oxazoline; carbonate compounds, such as ethylene carbonate; and hydroxy alkyl amide compounds, such as bis[N,N-di(β-hydroxyethyl)]adipamide. Of these, polyglycidyl compounds, such as (poly)ethylene glycol diglycidyl ether, (poly)ethylene glycol triglycidyl ether, (poly)glycerol diglycidyl ether, (poly)glycerol triglycidyl ether, (poly)propylene glycol polyglycidyl ether, and (poly)glycerol polyglycidyl ether are particularly preferable. These post-crosslinking agents may be used singly, or in a combination of two or more.

The content of the post-crosslinking agent is not particularly limited, as long as the salt water swelling height H of the resulting water-absorbent resin can be adjusted to the desired range. The lower limit of the amount of the post-crosslinking agent is, for example, preferably 0.20 mmol, more preferably 0.25 mmol, even more preferably 0.30 mmol, and particularly preferably 0.35 mmol, per mole of the total amount of the monomer components contained in polymer A. The upper limit of the amount of the post-crosslinking agent is, for example, preferably 10 mmol, more preferably 5 mmol, even more preferably 2 mmol, and particularly preferably 1 mmol, per mole of the total amount of the monomer components contained in polymer A.

The water-absorbent resin may contain other additives in addition to polymer A, as long as the effect of the invention is not impaired. When the water-absorbent resin contains other additives, the content is 5 mass % or less, preferably 3 mass % or less, more preferably 2 mass % or less, based on the entire amount of the water-absorbent resin.

The water-absorbent resin may contain a chelating agent, if necessary. When the water-absorbent resin contains a chelating agent, better water-absorption performance with respect to salt water may be achieved.

The chelating agent can be of any kind. For example, a wide range of known metal chelating agents can be used. The chelating agent preferably has five or more ligands. The upper limit of the number of ligands possessed by the chelating agent can be, for example, 12, 11, or 10.

Specific examples of chelating agents include ethylenediaminetetraacetic acid, nitrilotriacetic acid, hydroxyethylene diamine triacetic acid, diethylenetriamine pentaacetic acid, dihydroxyethyl glycine, diethylenetriamine pentamethylene phosphonic acid, and salts thereof. When the chelating agent is in the form of a salt, the salt can be of any kind. Examples include alkali metal salts such as salts of sodium and potassium; alkaline earth metal salts such as salts of magnesium and calcium; organic amine salts; ammonium salts; and the like. All or part of the ligands of the chelating agent can form a salt. Such chelating agents can be used singly or in a combination of two or more.

Among the chelating agents, diethylenetriamine pentaacetic acid and salts thereof, and diethylenetriamine pentamethylene phosphonic acid and salts thereof are preferably used.

When the water-absorbent resin contains a chelating agent, the amount of chelating agent is not particularly limited. For example, the content of the chelate agent is preferably 0.6 to 2.0 parts by mass, and more preferably 0.8 to 1.5 parts by mass, per 100 parts by mass of the water-absorbent resin.

When the water-absorbent resin contains a chelating agent, the method for incorporating the chelating agent into the water-absorbent resin is not particularly limited. A specific method for incorporating the chelating agent in the water-absorbent resin is described in detail below in section "2. Method for Producing Water-Absorbent Resin."

The shape of the water-absorbent resin of the present invention may be any of a variety of shapes, such as spheres, powder, granules, ellipses, flakes, rods, and chunks. In particular, from the viewpoint of ease of improving water-absorption performance with respect to salt water, the shape of the water-absorbent resin is preferably granular; for example, the water-absorbent resin preferably has an uneven surface configuration, such as cauliflower-like surface configuration.

The water-absorbent resin of the present invention is suitable for a wide variety of applications, such as industrial materials such as water-blocking agents, and agents for preventing dew condensation; hygienic materials such as disposable diapers and sanitary napkins; and agricultural and horticultural materials such as water-retaining agents and soil conditioners. In particular, the water-absorbent resin of the present invention, which has excellent water-absorption performance with respect to salt water, is suitable for application to water-blocking materials for power and communication cables that need to block seawater in coastal areas.

In particular, when the water-absorbent resin is used for, for example, water-blocking tapes, the water-absorbent resin, which has excellent water-absorption performance with respect to salt water, can provide excellent water-blocking effects even when the thickness of the tape is thinner than ever before.

The method for producing the water-soluble resin can be any method, and can be widely selected, for example, from conventional methods for producing water-absorbent resins. Examples include reversed-phase suspension polymerization, aqueous solution polymerization, emulsion polymerization, and like methods. From the standpoint of ease of adjusting the salt water swelling height H of the water-absorbent resin to the desired range, reversed-phase suspension polymerization is preferably used. In particular, a method including step 1 and step 2 described below is preferable.

2. Method for Producing Water-Absorbent Resin

The method for producing the water-absorbent resin of the present invention has the following step 1 and step 2.

Step 1: subjecting a monomer component containing acrylic acid and a salt thereof to reversed-phase suspension polymerization, and then drying the resulting polymer to obtain a partially neutralized polyacrylic acid.

Step 2: mixing the polyacrylic acid with a post-crosslinking agent to post-crosslink the polyacrylic acid.

In particular, in the production method of the present invention, the drying in step 1 is performed to achieve a water content of the polyacrylic acid of 10 to 30 mass %; and the amount of the post-crosslinking agent used in step 2 is 0.20 mmol or more per mole of the total amount of the monomer components.

Step 1

In step 1, a monomer component containing acrylic acid and a salt thereof is subjected to reversed-phase suspension polymerization to obtain a partially neutralized polyacrylic acid, and the partially neutralized polyacrylic acid is then dried. The reversed-phase suspension polymerization referred to herein is, for example, a method of polymerization by suspending a monomer component in a dispersion medium in the presence of a dispersion stabilizer, the monomer component being poorly soluble in the dispersion medium. In the production method of the present invention, the monomer component that is poorly soluble in the dispersion medium contains acrylic acid and a salt thereof.

In the present specification, the "monomer component containing acrylic acid and a salt thereof" used in step 1 is referred to as "monomer component A."

In step 1, the method for preparing monomer component A is not particularly limited. For example, acrylic acid is mixed with a neutralizer to convert a portion of the acrylic acid into acrylic acid salt, thus preparing monomer component A. Acrylic acid can be obtained by known production methods, or can be obtained from commercial products.

Examples of neutralizers include known alkaline neutralizers. Specific examples include alkali metal salts, such as sodium hydroxide, sodium carbonate, sodium hydrogen carbonate, potassium hydroxide, and potassium carbonate; ammonia; and the like. These alkaline neutralizers may be prepared and used in the form of an aqueous solution in order to simplify the neutralization operation. Such neutralizers may be used singly, or in a combination of two or more.

In neutralizing acrylic acid, the degree of neutralization is not particularly limited. For example, from the viewpoint that the resulting water-absorbent resin can easily attain the desired salt water swelling height H, the content of acrylic acid salt is usually 10 to 100 mol %, preferably 30 to 80 mol %, based on the total number of moles of the monomer components that constitute polymer A.

The conditions for neutralizing acrylic acid are not particularly limited. For example, known neutralization conditions can be widely used. For example, an aqueous solution of a neutralizer can be added dropwise to an aqueous solution of acrylic acid.

In step 1, monomer component A can contain monomers other than acrylic acid and a salt thereof, as long as the effect of the invention is not impaired. When monomer component A contains other monomers, the content of the other monomers is 5 mol % or less, preferably 3 mol % or less, more preferably 1 mol % or less, even more preferably 0.5 mol % or less, and particularly preferably 0.1 mol % or less, based on the total amount of the monomers in monomer component A. In view of most easily achieving a salt water swelling height of 3.5 mm/0.5 g or more, monomer component A preferably consists only of acrylic acid and an acrylic acid salt.

Monomer component A, which contains acrylic acid and a salt thereof, may be prepared and used in the form of an aqueous solution in order to increase the dispersion efficiency in a hydrocarbon dispersion medium when reversed-phase suspension polymerization is performed. The concentration of the monomer in such an aqueous solution may be any concentration; however, it may be usually 20 mass % or more and the saturation concentration or less, preferably 25 to 90 mass %, and more preferably 30 to 85 mass %.

The dispersion medium for use in reversed-phase suspension polymerization can be, for example, a hydrocarbon dispersion medium. Examples of the hydrocarbon dispersion medium include aliphatic hydrocarbons, such as n-hexane, n-heptane, n-octane, and ligroin; alicyclic hydrocarbons, such as cyclopentane, methyl cyclopentane, cyclohexane, and methyl cyclohexane; and aromatic hydrocarbons, such as benzene, toluene, and xylene. Of these dispersion mediums, n-hexane, n-heptane, and cyclohexane are preferably used from the standpoint of convenience in industrial availability, quality stability, and low price. These dispersion mediums may be used singly or in a combination of two or more. Examples of usable dispersion mediums include Exxsol Heptane (produced by Exxon Mobil Corporation: heptane and isomeric hydrocarbons) and Nappar 6 (produced by Exxon Mobil Corporation: cyclohexane and isomeric hydrocarbons), which are known as combined solvents; and the like.

In the reversed-phase suspension polymerization, a thickening agent can be used as needed. Examples of the thickening agent include hydroxyethyl cellulose, hydroxypropyl cellulose, methyl cellulose, carboxymethyl cellulose, polyacrylic acid, (partially) neutralized polyacrylic acid, polyethylene glycol, polyacrylamide, polyethyleneimine, dextrin, sodium alginate, polyvinyl alcohol, polyvinyl pyrrolidone, polyethylene oxide, and the like.

The dispersion stabilizer for use in the reversed-phase suspension polymerization may be a surfactant. Examples include sucrose fatty acid esters, polyglycerol fatty acid esters, sorbitan fatty acid esters, polyoxyethylene sorbitan fatty acid esters, polyoxyethylene glycerol fatty acid esters, sorbitol fatty acid esters, polyoxyethylene sorbitol fatty acid esters, polyoxyethylene alkyl ethers, polyoxyethylene alkyl phenyl ethers, polyoxyethylene castor oil, polyoxyethylene hydrogenated castor oil, alkylallyl formaldehyde condensed polyoxyethylene ethers, polyoxyethylene polyoxypropylene block copolymers, polyoxyethylene polyoxypropyl alkyl ethers, polyethylene glycol fatty acid esters, alkyl glucoside, N-alkyl gluconamide, polyoxyethylene fatty acid amide, polyoxyethylene alkylamine, phosphoric esters of polyoxyethylene alkyl ethers, phosphoric esters of polyoxyethylene alkyl allyl ethers, and the like. Among these, sorbitol fatty acid esters, polyglycerol fatty acid esters, sucrose fatty acid esters, and the like are preferable from the standpoint of monomer dispersion stability. These surfactants may be used singly, or in a combination of two or more. Among the sorbitan fatty acid esters, sorbitan monolaurate can be particularly mentioned as an example.

When the dispersion stabilizer used in reversed-phase suspension polymerization is a surfactant such as those exemplified above, the HLB value of the surfactant is preferably 3.5 to 12, more preferably 8 to 12, and particularly preferably 8.5 to 10.5, from the viewpoint of ease of adjusting the salt water swelling height H of the water-absorbent resin to the desired range.

In order to keep the water-soluble ethylenically unsaturated monomer well dispersed in a hydrocarbon dispersion medium and to achieve a dispersion effect that is commensurate with the amount of the surfactant used, the amount of surfactant used is preferably 0.1 to 30 parts by mass, and more preferably 0.3 to 20 parts by mass, per 100 parts by mass of the water-soluble ethylenically unsaturated monomer in the first stage.

The dispersion stabilizer for use may be a combination of a surfactant with a polymeric dispersant. Examples of usable polymeric dispersants include maleic anhydride-modified polyethylene, maleic anhydride-modified polypropylene, maleic anhydride-modified ethylene-propylene copolymers, maleic anhydride-modified EPDM (ethylene-propylene-diene terpolymer), maleic anhydride-modified polybutadiene, maleic anhydride-ethylene copolymers, maleic anhydride-propylene copolymers, maleic anhydride-ethylene-propylene copolymers, maleic anhydride-butadiene copolymers, polyethylene, polypropylene, ethylene-propylene copolymers, oxidized polyethylene, oxidized polypropylene, oxidized ethylene-propylene copolymers, ethylene-acrylic acid copolymers, ethyl cellulose, ethyl hydroxyethyl cellulose, and the like. Among these, maleic anhydride-modified polyethylene, maleic anhydride-modified polypropylene, maleic anhydride-modified ethylene-propylene copolymers, maleic anhydride-ethylene copolymers, maleic anhydride-propylene copolymers, maleic anhydride-ethylene-propylene copolymers, polyethylene, polypropylene, ethylene-propylene copolymers, oxidized polyethylene, oxidized polypropylene, oxidized ethylene-propylene copolymers, and the like are preferable from the standpoint of monomer dispersion stability. These polymeric dispersants may be used singly, or in a combination of two or more.

In order to keep monomer component A containing acrylic acid and a salt thereof well dispersed in a hydrocarbon dispersion medium and achieve a dispersion effect that is commensurate with the amount of the polymeric dispersant used, the amount of the polymeric dispersant for use is preferably 0.1 to 30 parts by mass, and more preferably 0.3 to 20 parts by mass, per 100 parts by mass of monomer component A in the first stage described below.

In the reversed-phase suspension polymerization in step 1, for example, a wide range of known polymerization initiators can be used. Examples of radical polymerization initiators include persulfates, such as potassium persulfate, ammonium persulfate, and sodium persulfate; peroxides, such as methyl ethyl ketone peroxide, methyl isobutyl ketone peroxide, di-t-butylperoxide, t-butyl cumylperoxide, and hydrogen peroxide; azo compounds, such as 2,2'-azobis(2-methylpropionamidine)dihydrochloride, 2,2'-azobis[2-(N-phenylamidino)propane]dihydrochloride, 2,2'-azobis[2-(N-allylamidino)propane]dihydrochloride, and 4,4'-azobis(4-cyanovaleric acid); and the like.

The radical polymerization initiators can also be combined with one or more reducing agents, such as sodium sulfite, sodium hydrogen sulfite, ferrous sulfate, and L-ascorbic acid, to use them as redox polymerization initiators.

The lower limit of the amount of the radical polymerization initiator for use in the reversed-phase suspension polymerization is preferably 0.01 mmol, and more preferably 0.05 mmol, per mole of the total amount of polymer component A used from the standpoint of polymerization stability. The upper limit of the amount of the radical polymerization initiator for use is preferably 20 mmol, and more preferably 10 mmol, per mole of the total amount of monomer component A used from the standpoint of polymerization stability. The use of the radical polymerization initiator in an amount within this numerical range makes it easier to produce the water-absorbent resin.

A chain transfer agent may optionally be used in the reversed-phase suspension polymerization, if necessary. Examples of the chain transfer agent include hypophosphites, thiols, thiolic acids, secondary alcohols, amines, and the like.

In the reversed-phase suspension polymerization, internal-crosslinking agents can be used as needed. This allows the polymer obtained by reversed-phase suspension polymerization (partially neutralized polyacrylic acid) to have a structure in which the inside of the polymer is crosslinked with an internal-crosslinking agent. The internal-crosslinking agent is added, for example, to monomer component A containing acrylic acid and a salt thereof.

Examples of the internal-crosslinking agent include compounds having two or more polymerizable unsaturated groups. Specific examples of the internal-crosslinking agent include di or tri(meth)acrylic acid esters of polyols, such as (poly)ethylene glycol (in the present specification, for example, "polyethylene glycol" and "ethylene glycol" together are referred to as "(poly)ethylene glycol"; the same applies below), (poly)propylene glycol, trimethylolpropane, glycerol polyoxyethylene glycol, polyoxy propylene glycol, and (poly)glycerol; unsaturated polyesters obtained by reacting the polyols listed above with unsaturated acids, such as maleic acid and fumaric acid; bisacrylamides, such as N,N'-methylenebis(meth)acrylamide; di or tri(meth) acrylic acid esters obtained by reacting polyepoxide with (meth)acrylic acid; di(meth)acrylic acid carbamyl esters obtained by reacting polyisocyanate, such as tolylene diisocyanate and hexamethylene diisocyanate, with hydroxyethyl (meth)acrylate; allylated starch; allylated cellulose; diallyl phthalate; N,N',N"-triallyl isocyanurate; divinyl benzene; and the like.

Examples of the internal-crosslinking agent further include, in addition to the compounds having two or more polymerizable unsaturated groups, glycidyl group-containing compounds, such as (poly)ethylene glycol diglycidyl ether, (poly)propylene glycol diglycidyl ether, and (poly) glycerol diglycidyl ether; (poly)ethylene glycol, (poly)propylene glycol, (poly)glycerol, pentaerythritol, ethylene diamine, polyethyleneimine, glycidyl (meth)acrylate, and the like. These internal-crosslinking agents may be used in a combination of two or more. Among these, (poly)ethylene glycol diglycidyl ether, (poly)propylene glycol diglycidyl ether, (poly)glycerol diglycidyl ether, and N,N'-methylenebisacrylamide are preferable from the standpoint of excellent reactivity at low temperatures.

When an internal-crosslinking agent is used, the amount of the internal-crosslinking agent for use is not particularly limited. The lower limit of the amount of the internal-crosslinking agent for use is preferably 0.0001 mmol, more preferably 0.0005 mmol, even more preferably 0.001 mmol, and particularly preferably 0.01 mmol, per mole of the total amount of monomer component A used. The upper limit of the amount of the internal-crosslinking agent for use is preferably 5 mmol, more preferably 0.5 mmol, and even more preferably 0.05 mmol, per mole of total amount of monomer component A used.

The water-absorbent resin obtained in step 1 and step 2 has an internally-crosslinked structure. The crosslinking density of the internal-crosslinking can be appropriately adjusted according to the amount of the internal-crosslinking agent used, as needed. In the production method of the present invention, it is also preferable not to use an internal-crosslinking agent because it is easier to adjust the salt water swelling height H to a desired range.

The temperature for the polymerization reaction in the reversed-phase suspension polymerization can be suitably determined in accordance with, for example, the type and amount of radical polymerization initiator used. The temperature for the polymerization reaction can be, for example, 20 to 110° C., and preferably 40 to 90° C. The reaction time can be set, for example, within the range of 0.1 hours or more to 4 hours or less.

In step 1, the reversed-phase suspension polymerization can be performed, for example, by adding an aqueous solution containing a monomer component containing acrylic acid and a salt thereof (monomer component A), a radical polymerization initiator, and an internal-crosslinking agent that is optionally used as necessary, to a dispersion medium in which a surfactant has been dissolved to form a suspension. The order of adding each starting material is not limited to this order.

In the reversed-phase suspension polymerization, monomer component A is polymerized to produce a partially neutralized polyacrylic acid (polymer A). For example, the reversed-phase suspension polymerization produces a slurry in which partially neutralized polyacrylic acid is dispersed. Polymer A obtained by the reversed-phase suspension polymerization is, for example, in the state of a swollen gel. The partially neutralized polyacrylic acid obtained by the reversed-phase suspension polymerization is usually in the form of particles. Just to note, polymer A obtained by the reversed-phase suspension polymerization in step 1 is not post-crosslinked.

The reversed-phase suspension polymerization may be performed in one stage; or in multiple stages, such as two or more stages. When the reversed-phase suspension polymerization is performed in two or more stages, the first stage of reversed-phase suspension polymerization may be performed by the method described above; and then monomer component A may be added to and mixed with the reaction mixture obtained in the first stage of the polymerization to perform the second and subsequent stages of reversed-phase suspension polymerization, in the same manner as in the first stage. In the reversed-phase suspension polymerization at the second stage or each of the subsequent stages after the second stage, the radical polymerization initiator and the optionally added internal-crosslinking agent, in addition to monomer component A, can be added in a molar ratio of each component to monomer component A within the numerical ranges described above, based on the amount of the water-soluble ethylenically unsaturated monomer added at the second stage or each of the subsequent stages after the second stage of reversed-phase suspension polymerization; and then reversed-phase suspension polymerization can be performed under the same conditions as those of the method described above.

When the reversed-phase suspension polymerization is performed in multiple stages, it is preferable to set the total amount of the polymerization initiator and the total amount of the optionally used internal-crosslinking agent, per mole of monomer component A used in reversed-phase suspension polymerization, so as to fall within the numerical ranges described above.

In step 1, after the reversed-phase suspension polymerization, a crosslinking agent may be further added to the reaction mixture obtained by the reversed-phase suspension polymerization, if necessary, before the drying treatment described below. The crosslinking agent used herein is the intermediate crosslinking agent described above.

The type of intermediate crosslinking agent is not particularly limited. For example, the same type of crosslinking agent as the internal-crosslinking agent described above can be used. Examples of intermediate crosslinking agents that can be preferably used are also the same as those of the internal-crosslinking agent described above. When an intermediate crosslinking agent and an internal-crosslinking agent are used, the type of intermediate crosslinking agent may be the same as or different from that of the internal-crosslinking agent.

The lower limit of the amount of the intermediate crosslinking agent to be used is not particularly limited. For example, the lower limit is preferably 0.0001 mmol, more preferably 0.0005 mmol, and even more preferably 0.001 mmol, and particularly preferably 0.01 mmol, per mole of the total amount of monomer component A used. The upper limit of the amount of intermediate crosslinking agent to be used is preferably 5 mmol, more preferably 0.5 mml, and even more preferably 0.05 mmol, per mole of the total amount of monomer component A used.

In step 1, after polymer A (a partially neutralized polyacrylic acid) is generated by the reversed-phase suspension polymerization, a drying treatment can be performed. The drying treatment is a step to remove water from the polymer obtained by the reversed-phase suspension polymerization, by external energy such as heat.

In step 1, the drying treatment is performed so that polymer A has a water content of 10 to 30 mass %. Adjusting the water content to the above-mentioned range by the drying treatment in step 1 facilitates adjustment of the crosslinking density to an appropriate range by post-crosslinking, which is performed in the subsequent step, so that the salt water swelling height H of the resulting water-absorbent resin can be adjusted to the desired range. The lower limit of the water content of polymer A obtained by the drying treatment is preferably 11 mass %, more preferably 12 mass %, even more preferably 13 mass %, still even more preferably 14 mass %, and particularly preferably 15 mass %. The upper limit of the water content of polymer A obtained by the drying step is preferably 29 mass %, more preferably 28 mass %, even more preferably 27 mass %, and particularly preferably 26 mass %.

The water content as referred to herein means the "percentage of water content" (by mass %), based on the total mass of polymer A obtained after the drying treatment (a partially neutralized polyacrylic acid containing water). Specifically, the water content of polymer A is the percentage of the mass of water remaining in the reaction system after the drying treatment described above, relative to the total mass of the monomer components used in the polymerization reaction, the water subjected to the polymerization reaction, and the water produced in the neutralization reaction. The water content is calculated by the following formula (1). In the following formula (1), the mass of water remaining in the reaction system is calculated by subtracting the mass of water removed by the drying treatment from the mass of water subjected to the polymerization reaction and the mass of water produced in the neutralization reaction.

$$\text{Water content} = \{\text{Mass of water remaining in the reaction system}/(\text{Mass of monomer component subjected to polymerization reaction} + \text{Mass of water subjected to polymerization reaction} + \text{Mass of water produced in neutralization reaction})\} \times 100 \quad (1)$$

The drying treatment method to adjust the water content as described above is not particularly limited. For example, the drying treatment can be performed by azeotropic distillation in the state that polymer A obtained by reversed-phase suspension polymerization is dispersed in a dispersion medium. This drying treatment can be performed under ambient pressure or under reduced pressure, and can be performed under an air stream such as nitrogen to increase drying efficiency. When the drying treatment is performed under normal pressure, the drying temperature is preferably 70 to 250° C., more preferably 80 to 180° C., even more preferably 80 to 140° C., and particularly preferably 90 to 130° C. When the drying treatment is performed under reduced pressure, the drying temperature is preferably 40 to 160° C., and more preferably 50 to 120° C. The water content of polymer A (partially neutralized polyacrylic acid) can be adjusted by appropriately selecting the drying temperature and drying time (i.e., the temperature and time of azeotropic distillation). This drying treatment produces a dispersion in which polymer A having a water content adjusted to the desired range is dispersed in a dispersion medium.

Step 2

Step 2 is a step for mixing a partially neutralized polyacrylic acid obtained in step 1 and having a water content adjusted to a predetermined range (i.e., polymer A obtained in step 1) with a post-crosslinking agent to post-crosslink the polyacrylic acid.

The type of post-crosslinking agent for use in step 2 is not particularly limited. The same types of post-crosslinking agents as those described above in section "1. Water-Absorbent Resin" can be mentioned as examples. Examples of post-crosslinking agents that can be preferably used are also the same as those described above.

The post-crosslinking method can, for example, include mixing a post-crosslinking agent with a solvent to prepare a treatment solution containing the post-crosslinking agent, and bringing the partially neutralized polyacrylic acid into contact with this treatment solution to thereby treat the partially neutralized polyacrylic acid with the post-crosslinking agent.

The solvent for use to prepare the treatment solution containing a post-crosslinking agent can be any solvent. For example, hydrophilic organic solvents that dissolve the post-crosslinking agent well can be used. Examples of the solvent include, in addition to water, lower alcohols, such as methyl alcohol, ethyl alcohol, n-propyl alcohol, isopropyl alcohol, and propylene glycol; ketones, such as acetone and methyl ethyl ketone; ethers, such as diethyl ether, dioxane, and tetrahydrofuran; amides, such as N,N-dimethyl formamide; and sulfoxides, such as dimethyl sulfoxide; and the like. These hydrophilic organic solvents can be used singly or in a combination of two or more, or as a mixture solvent with water.

The treatment solution can be prepared, for example, by dissolving the post-crosslinking agent in a solvent. The mixing ratio of the post-crosslinking agent to the solvent is not particularly limited. The mixing ratio can be, for example, 0.1 to 10 parts by mass of the post-crosslinking agent per 100 parts by mass of the solvent.

The mixing of polymer A obtained in step 1 with the treatment solution is not particularly limited. For example, a method of adding the treatment solution to the partially neutralized polyacrylic acid contained in a container can be used. The partially neutralized polyacrylic acid contained in the container contains the dispersion medium used in the reversed-phase suspension polymerization.

The amount of post-crosslinking agent used is not particularly limited, as long as the salt water swelling height H of the resulting water-absorbent resin is adjusted to the desired range. For example, the lower limit of the amount of post-crosslinking agent used is preferably 0.20 mmol, more preferably 0.25 mmol, even more preferably 0.30 mmol, and particularly preferably 0.35 mmol, per mole of the total amount of monomer component A. The upper limit of the amount of post-crosslinking agent used is preferably 10 mmol, more preferably 5 mmol, even more preferably 2 mmol, even more preferably 1 mmol, and particularly preferably 0.8 mmol, per mole of the total amount of monomer component A.

The reaction temperature (i.e., the temperature at which the partially neutralized polyacrylic acid is treated with the post-crosslinking agent) in the post-crosslinking is preferably 50 to 250° C., more preferably 60 to 180° C., and even more preferably 60 to 140° C. The reaction time of the post-crosslinking (i.e., the time for treating the partially neutralized polyacrylic acid with the post-crosslinking agent at the reaction temperature) cannot be determined in general because the reaction time varies depending on the reaction temperature, the type and the amount of the post-crosslinking agent used, etc. However, the reaction temperature is usually 1 to 300 minutes, and preferably 5 to 200 minutes.

The post-crosslinking described above produces polymer A having a post-crosslinked structure. This post-crosslinking, for example, selectively forms a crosslinked structure in the vicinity of the surface of the polyacrylic acid particles. In step 2, after the post-crosslinking, a heating treatment can be performed to evaporate the remaining dispersant, if necessary. In this case, for example, after the post-crosslinking step, the heating treatment can be performed after cooling, or the heating treatment can be performed by further raising the temperature after the post-crosslinking.

In the production method of the present invention, in addition to steps 1 and 2, the production method of the present invention can further include a step of adding a chelating agent (hereinafter simply referred to as "chelating agent addition step"). The chelating agent addition step is a step for adding a chelating agent to the water-absorbent resin. The same types of chelating agents as described above in section "1. Water-Absorbent Resin" can be mentioned as examples.

The chelating agent addition step can be carried out, for example, before the drying treatment in step 1, or the chelating agent addition step can be carried out in the reversed-phase suspension polymerization described above. If the chelating agent addition step is performed in the reversed-phase suspension polymerization, the chelating agent may be added to a container for the polymerization reaction before the polymerization reaction proceeds, or the chelating agent may be added to a container for the polymerization reaction while the polymerization reaction is in progress. The chelating agent may be added after the post-crosslinking step in step 2. The chelating agent addition step is preferably performed after the completion of the reversed-phase suspension polymerization in step 1, and more preferably performed before the drying treatment.

When the chelating agent is added, the chelating agent can be added in the form of, for example, a solution of the chelating agent dissolved in a solvent, such as water, or the chelating agent can be added without using a solvent, for example, in a solid state. When the chelating agent is added, the partially neutralized polyacrylic acid may be in the state of being dispersed in a dispersion medium, or may be in the form of a powder or the like by removing the dispersion medium. When the polymer is in the form of a powder, the so-called dry-blending method can be used in the chelating agent addition step.

In the chelating agent addition step, the amount of chelating agent used is not particularly limited. For example, from the viewpoint that a swelling rate height H within the desired range can be easily achieved, the lower limit of the amount of chelating agent used is preferably 0.25 mmol, more preferably 0.3 mmol, even more preferably 0.4 mmol, and particularly preferably 0.45 mmol, per mole of the total amount of monomer component A. The upper limit of the amount of the chelating agent used is preferably 10 mmol, more preferably 5 mmol, and even more preferably 3 mmol, per mole of the total amount of monomer component A.

When the production method of the present invention includes a chelating agent addition step, the obtained water-absorbent resin contains a chelating agent.

The production method of the present invention can further include a step of adding other additives, which may be performed in any of the following steps: step 1, step 2, and a chelating agent addition step that is optionally performed; or as a step other than these steps. Such other additives can impart various properties to the resulting water-absorbent resin according to the intended purpose. Such additives can be various additives conventionally added to water-absorbent resins. Examples include inorganic powders, surfactants, oxidants, reducing agents, radical chain inhibitors, antioxidants, antimicrobial agents, deodorants, and the like.

3. Water-Blocking Material

As long as the water-blocking material of the present invention includes a water-absorbent resin, the composition of the water-blocking material is not particularly limited. For example, the water-blocking material can have the same composition as a known water-blocking material. The water-blocking material can be formed of a water-absorbent resin alone. Alternatively, a mixture of water-absorbent resin and rubber and/or thermoplastic resin, etc., can be formed into a water-blocking material. The water-absorbent resin can also be retained in a non-woven fabric or paper to form a water-blocking material.

The water-blocking material of the present invention can be applied to various applications. For example, the water-blocking material can be used for various cables such as optical cables, metal cables, and like communication cables; and power cables. In particular, the water-absorbent resin of the present invention, which has excellent water-absorption performance with respect to salt water, is suitable for application to water-blocking materials for power cables that need to block seawater in coastal areas, and fiber optic cables that are used underground and undersea. The water-blocking material has excellent water-absorption performance with respect to salt water. Therefore, for example, when used as a water-blocking tape, the desired water-blocking effect can be obtained even if the tape is thinner than ever before.

EXAMPLES

The following describes the present invention in more detail with reference to Examples. However, the present invention is not limited to the embodiments of these Examples.

Example 1

Step 1: Reversed-Phase Suspension Polymerization

A round-bottom cylindrical separable flask with an inner diameter of 110 mm equipped with a reflux condenser, a dropping funnel, a nitrogen gas inlet tube, and stirring blades including two sets of 4 slanted paddle blades with a blade diameter of 50 mm (surface-coated with a fluorine resin) (hereinafter referred to as the round-bottom flask) was prepared. As a petroleum hydrocarbon dispersion medium, 485 mL of n-heptane was added to the round-bottom flask. As a surfactant, 1.10 g of sorbitan monolaurate (produced by NOF Corporation, product name: Nonionic LP-20R; HLB 8.6) was added. The temperature of the resulting mixture was raised to 50° C., thus preparing a solution of the surfactant in n-heptane.

On the other hand, 92 g (1.03 mol) of an 80.5 mass % aqueous acrylic acid solution was added as an aqueous solution of the water-soluble ethylenically unsaturated monomer to a beaker with an inner volume of 300 mL. While the aqueous acrylic acid solution was cooled in ice water, 147.7 g of a 20.9 mass % aqueous sodium hydroxide solution was added dropwise to the beaker to neutralize 75 mol % of the acrylic acid. Then, 0.10 g (0.00037 mol) of potassium persulfate was added as a radical polymerization initiator, and dissolved to prepare an aqueous liquid.

Subsequently, the entire aqueous liquid was added to the solution of the surfactant in n-heptane in the round-bottom flask. While stirring with a stirrer at 700 rpm, the round-bottom flask was purged with nitrogen for 30 minutes. The round-bottom flask was then immersed in a water bath at 70° C. to raise the temperature of the reaction system, and a polymerization reaction was allowed to proceed for 1 hour to perform reversed-phase suspension polymerization. A water-containing gel-like polymer was obtained in the round-bottom flask by this reversed-phase suspension polymerization.

Step 1: Drying Treatment

Subsequently, the round-bottom flask after the reversed-phase suspension polymerization was immersed in an oil bath at 125° C., and 126.64 g of water was removed from the system while refluxing n-heptane by azeotropic distillation of water and n-heptane to perform a drying treatment. A partially neutralized polyacrylic acid was thereby obtained. The water content of the partially neutralized polyacrylic acid after the drying treatment was 19.5%. The water content was calculated according to the above formula (1).

Step 2: Post-Crosslinking

After the above step, 4.14 g (0.48 mmol) of a 2 mass % aqueous ethylene glycol diglycidyl ether solution was added as a post-crosslinking agent to the round-bottom flask. Subsequently, the round-bottom flask was heated to adjust the treatment temperature with the post-crosslinking agent to 83° C. The flask was maintained at this temperature for 2 hours to post-crosslink the partially neutralized polyacrylic acid. The round-bottom flask was then heated to 125° C., and n-heptane in the round-bottom flask was evaporated at 125° C. to obtain 91.82 g of granular water-absorbent resin particles.

Example 2

Reversed-phase suspension polymerization was performed in the same manner as in Example 1. After this reversed-phase suspension polymerization, the round-bottom flask was immersed in an oil bath at 125° C., and 125.12 g of water was removed from the system while refluxing n-heptane by azeotropic distillation of water and n-heptane to perform a drying step, thus obtaining a partially neutralized polyacrylic acid. The water content of the partially neutralized polyacrylic acid after this drying step was 20.5%. After this, 5.52 g (0.63 mmol) of a 2 mass % aqueous ethylene glycol diglycidyl ether solution was added to the round-bottom flask as a post-crosslinking agent. Subsequently, the round-bottom flask was heated to adjust the treatment temperature with the post-crosslinking agent to 83° C. The flask was maintained at this temperature for 2 hours to perform post-crosslinking of the partially neutralized polyacrylic acid (step 2). The round-bottom flask was then heated to 125° C., and n-heptane in the round-bottom flask was evaporated at 125° C. to obtain 82.27 g of granular water-absorbent resin particles.

Example 3

Reversed-phase suspension polymerization was performed in the same manner as in Example 1. After this reversed-phase suspension polymerization, 0.41 g (0.047 mmol) of a 2 mass % aqueous ethylene glycol diglycidyl ether solution was added to the round-bottom flask as an intermediate crosslinking agent before the drying treatment was performed. Subsequently, the round-bottom flask after this reversed-phase suspension polymerization was immersed in an oil bath at 125° C., and 121.00 g of water was removed from the system while refluxing n-heptane by azeotropic distillation of water and n-heptane to perform a drying treatment, thus obtaining a partially neutralized polyacrylic acid. The water content of the partially neutralized polyacrylic acid after this drying treatment was 23.3%.

After this drying treatment, 4.14 g (0.48 mmol) of a 2 mass % aqueous ethylene glycol diglycidyl ether solution was added to the round-bottom flask. Subsequently, the round-bottom flask was heated to a temperature of 83° C. for treatment with the post-crosslinking agent, and maintained at this temperature for 2 hours to perform post-crosslinking of the partially neutralized polyacrylic acid. The round-bottom flask was then heated to 125° C., and the n-heptane in the round-bottom flask was evaporated at 125° C. to obtain 82.12 g of granular water-absorbent resin particles.

Example 4

Reversed-phase suspension polymerization was performed in the same manner as in Example 1. After this reversed-phase suspension polymerization, the round-bottom flask was immersed in an oil bath at 125° C., and 129.65 g of water was removed from the system while refluxing n-heptane by azeotropic distillation of water and n-heptane to perform a drying treatment, thereby obtaining a partially neutralized polyacrylic acid. The water content of the partially neutralized polyacrylic acid after this drying treatment was 18.0%. After this drying step and before adding a post-crosslinking agent, 2.10 g (1.9 mmol) of a 45 mass % aqueous solution of pentasodium salt of diethylenetriamine pentaacetic acid was added to the round-bottom flask.

Subsequently, 4.14 g (0.48 mmol) of a 2 mass % aqueous ethylene glycol diglycidyl ether solution was added as a post-crosslinking agent to the round-bottom flask. Subsequently, the round-bottom flask was heated to a temperature of 83° C. for treatment with the post-crosslinking agent, and maintained at this temperature for 2 hours to perform post-crosslinking of the partially neutralized polyacrylic acid. The round-bottom flask was then heated to 125° C., and n-heptane in the round-bottom flask was evaporated at 125° C. to obtain 89.40 g of granular water-absorbent resin particles.

Comparative Example 1

Reversed-phase suspension polymerization was performed in the same manner as in Example 1. After this reversed-phase suspension polymerization, the round-bottom flask was immersed in an oil bath at 125° C., and 111.69 g of water was removed from the system while refluxing n-heptane by azeotropic distillation of water and n-heptane to perform a drying treatment, thereby obtaining a partially neutralized polyacrylic acid. The water content of the partially neutralized polyacrylic acid after this drying treatment was 28.9%. After this drying treatment, 2.76 g (0.32 mmol) of a 2 mass % aqueous ethylene glycol diglycidyl ether solution was added as a post-crosslinking agent to the round-bottom flask. Subsequently, the round-bottom flask was heated to a temperature of 83° C. for treatment with the post-crosslinking agent, and maintained at this temperature for 2 hours to perform post-crosslinking of the partially neutralized polyacrylic acid (step 2). The round-bottom flask was then heated to 125° C., and the n-heptane in the round-bottom flask was evaporated at 125° C. to obtain 82.85 g of granular water-absorbent resin particles.

Comparative Example 2

Reversed-phase suspension polymerization was performed in the same manner as in Example 1. After this reversed-phase suspension polymerization, the round-bottom flask was immersed in an oil bath at 125° C., and 122.46 g of water was removed from the system while refluxing n-heptane by azeotropic distillation of water and n-heptane to perform a drying treatment, thereby obtaining a partially neutralized polyacrylic acid. The water content of the partially neutralized polyacrylic acid after this drying treatment was 22.3%. After this drying treatment, 1.84 g (0.21 mmol) of a 2 mass % aqueous ethylene glycol diglycidyl ether solution was added as a post-crosslinking agent to the round-bottom flask. Subsequently, the round-bottom flask was heated to a temperature of 83° C. for treatment with the post-crosslinking agent, and maintained at this temperature for 2 hours to perform post-crosslinking of the partially neutralized polyacrylic acid (step 2). The round-bottom flask was then heated to 125° C., and n-heptane in the round-bottom flask was evaporated at 125° C. to obtain 83.33 g of granular water-absorbent resin particles.

Comparative Example 3

Reversed-phase suspension polymerization was performed in the same manner as in Example 1. After this reversed-phase suspension polymerization, the round-bottom flask was immersed in an oil bath at 125° C., and 136.96 g of water was removed from the system while refluxing n-heptane by azeotropic distillation of water and n-heptane to perform a drying treatment, thereby obtaining a partially neutralized polyacrylic acid. The water content of the partially neutralized polyacrylic acid after this drying treatment was 11.4%. After this drying treatment, 2.10 g (1.9 mmol) of a 45 mass % aqueous solution of pentasodium salt of diethylenetriamine pentaacetic acid was added to the round-bottom flask before adding a post-crosslinking agent.

Subsequently, as a post-crosslinking agent, 4.14 g (0.48 mmol) of a 2 mass % aqueous ethylene glycol diglycidyl ether solution was added to the round-bottom flask. Subsequently, the round-bottom flask was heated to a temperature of 83° C. for treatment with the post-crosslinking agent, and maintained at this temperature for 2 hours to perform post-crosslinking of the partially neutralized polyacrylic acid. The round-bottom flask was then heated to 125° C., and n-heptane in the round-bottom flask was evaporated at 125° C. to obtain 89.40 g of granular water-absorbent resin particles.

Comparative Example 4

A round-bottom cylindrical separable flask with an inner diameter of 110 mm equipped with a reflux condenser, a dropping funnel, a nitrogen-gas inlet tube, and stirring blades including two sets of 4 slanted paddle blades with a blade diameter of 50 mm (hereinafter referred to as the round-bottom flask) was prepared. As a petroleum hydrocarbon dispersion medium, 293 g of n-heptane was placed in the round-bottom flask, and 0.74 g of sucrose stearate (Mitsubishi-Kagaku Foods Corporation, Ryoto Sugar Ester S-370; HLB3) and 0.74 g of a maleic anhydride-modified ethylene-propylene copolymer (Mitsui Chemicals, Inc., Hi-WAX 1105A) were added thereto. While stirring, the mixture was heated to 80° C. with stirring to dissolve the surfactant, and then cooled to 50° C.

On the other hand, 92 g (1.03 mol) of an 80.5 mass % aqueous acrylic acid solution was added as a water-soluble ethylenically unsaturated monomer solution to a beaker with an inner volume of 300 mL. While the aqueous acrylic acid solution was cooled in ice water, 147.7 g of a 20.9 mass % aqueous sodium hydroxide solution was added dropwise to the beaker to neutralize 75 mol % of the acrylic acid. Then, 0.074 g (0.27 mmol) of potassium persulfate as a radical polymerization initiator and 0.51 g (0.058 mmol) of a 2 mass % aqueous ethylene glycol diglycidyl ether solution as an internal-crosslinking agent were added and dissolved to prepare an aqueous monomer solution for the first stage.

The entire aqueous monomer solution for the first stage was added to the round-bottom flask described above. After the reaction system was fully purged with nitrogen, the flask was immersed in a 70° C. water bath to raise the temperature, and the first-stage polymerization was performed for 30 minutes to obtain the first-stage reaction mixture. On the other hand, 128.8 g (1.43 mole) of an 80.5 mass % aqueous acrylic acid solution was placed in another 300-mL beaker. While cooling from outside, 160.9 g of a 26.8 mass % aqueous sodium hydroxide solution was added dropwise to neutralize 75 mol % of the acrylic acid. Then, 0.10 g (0.37 mmol) of potassium persulfate as a radical polymerization initiator and 0.58 g (0.067 mmol) of a 2 mass % aqueous ethylene glycol diglycidyl ether solution as an internal-crosslinking agent were added and dissolved to prepare a monomer aqueous solution for the second stage.

The first-stage reaction mixture was cooled to 24° C., and the aqueous monomer solution for the second stage having the same temperature was added to the reaction system and allowed to be absorbed for 30 minutes while fully purging the reaction system with nitrogen. The flask was then immersed in a 70° C. water bath again to raise the temperature to perform second-stage polymerization for 30 minutes.

After the second-stage polymerization, the reaction mixture was heated in an oil bath at 125° C. While refluxing n-heptane by azeotropic distillation of water and n-heptane, 269.48 g of water was removed from the system to perform a drying treatment, thereby obtaining a partially neutralized polyacrylic acid. The water content of the partially neutralized polyacrylic acid after this drying treatment was 16.0%. Then, 0.58 g (0.53 mmol) of a 45 mass % aqueous solution of pentasodium salt of diethylenetriamine pentaacetic acid was added. Subsequently, 4.42 g (0.51 mmol) of a 2 mass % aqueous ethylene glycol diglycidyl ether solution was added as a post-crosslinking agent. The reaction mixture was then heated in an oil bath at 125° C., and n-heptane was evaporated to dryness to thereby obtain 83.8 g of a water-absorbent resin.

Comparative Example 5

A round-bottom cylindrical separable flask with an inner diameter of 110 mm equipped with a reflux condenser, a dropping funnel, a nitrogen-gas inlet tube, and stirring blades including two sets of 4 slanted paddle blades with a blade diameter of 50 mm (hereinafter referred to as the round-bottom flask) was prepared. As a petroleum hydrocarbon dispersion medium, 293 g of n-heptane was placed in the round-bottom flask, and 0.74 g of sucrose stearate (Mitsubishi-Kagaku Foods Corporation, Ryoto Sugar Ester S-370; HLB3) and 0.74 g of a maleic anhydride-modified ethylene-propylene copolymer (Mitsui Chemicals, Inc., Hi-WAX 1105A) were added thereto. The mixture was heated to 80° C. with stirring to dissolve the surfactant, and then cooled to 50° C.

On the other hand, 26.1 g (0.29 mol) of an 80.5 mass % aqueous acrylic acid solution was added as a water-soluble ethylenically unsaturated monomer solution to a beaker with an inner volume of 300 mL. While the aqueous acrylic acid solution was cooled in ice water, 41.9 g of 20.9 mass % sodium hydroxide solution was added dropwise to the beaker to neutralize 75 mol % of the acrylic acid. Subsequently, 75.1 g (0.29 mol) of an 80.5 mass % aqueous 2-acrylamide-2-methylpropane sulfonic acid (ATBS) solution was added to another beaker with an internal volume of 300 mL. While the aqueous 2-acrylamide 2-methylpropanesulfonic acid solution was cooled with ice water, 96.6 g of a 9.1 mass % aqueous sodium hydroxide solution was added dropwise to the beaker to neutralize 75 mol % of the 2-acrylamide-2-methylpropanesulfonic acid. Then, the entire 75 mol % neutralized aqueous acrylic acid solution was added, and 0.052 g (0.19 mmol) of 2,2'-azobis(2-amidinopropane) dihydrochloride and 0.021 g (0.077 mmol) of potassium persulfate were added as radical polymerization initiators were added and dissolved, and 1.56 (0.090 mmol) of a 1 mass % aqueous ethylene glycol diglycidyl ether solution was added as an internal-crosslinking agent and dissolved to prepare an aqueous liquid.

Subsequently, the entire aqueous liquid was added to the solution of surfactant in n-heptane in the round-bottom flask. While stirring with a stirrer at 160 rpm, the round-bottom flask was purged with nitrogen for 30 minutes. The round-bottom flask was then immersed in a water bath at 70° C. to raise the temperature of the reaction system and a polymerization reaction was allowed to proceed for 30 minutes to perform reversed-phase suspension polymerization. This reversed-phase suspension polymerization yielded a water-containing gel-like polymer in the round-bottom flask. Subsequently, the round-bottom flask was immersed in an oil bath at 125° C., and 120.58 g of water was removed from the system while refluxing n-heptane by azeotropic distillation of water and n-heptane to perform a drying treatment. A partially neutralized polyacrylic acid was thereby obtained. The water content of the partially neutralized polyacrylic acid after the drying treatment was 23.5%.

After this drying treatment, 1.05 g (0.30 mmol) of a 5 mass % aqueous ethylene glycol diglycidyl ether solution was added as a post-crosslinking agent to the round-bottom flask. Subsequently, the round-bottom flask was heated to a temperature of 80° C. for treatment with the post-crosslinking agent. The flask was maintained at this temperature for 2 hours to perform the post-crosslinking of the partially neutralized polyacrylic acid. The round-bottom flask was then heated to 125° C., and n-heptane in the round-bottom flask was evaporated at 125° C. to obtain 83.20 g of granular water-absorbent resin particles.

Method for Measuring the Amount of Salt Water Absorbed by Water-Absorbent Resin Particles After 500 g of 3.3 mass % salt water was placed in a 500-mL beaker, 2.0 g of water-absorbent resin particles were added thereto and the resulting mixture was stirred for 60 minutes. The contents in the beaker was filtered through a JIS-standard sieve having an opening of 75 μm whose mass Wa (g) had been measured beforehand. The sieve was inclined at an angle of about 30 degrees relative to the horizon, and allowed to stand in that state for 15 minutes so as to filter out excess water.

A mass Wb (g) of the sieve containing water-absorbent gel therein was measured. The water absorption capacity was determined by the following formula.

Water absorption capacity=Wb−Wa/2.0

Method for Measuring Salt Water Absorption Rate of Water-Absorbent Resin Particles The water absorption rate was measured in a room controlled at 25° C.±1° C. After measuring out 50±0.1 g of 3.3 mass % salt water into a 100 mL-volume beaker, a magnetic stirrer bar (8 mm φ×30 mm, without a ring) was placed in the beaker. The beaker was immersed in a thermostatic bath to adjust the liquid temperature to 25±0.2° C. Subsequently, after the beaker was placed on the magnetic stirrer and a vortex was created in the salt water at a rotational speed of 600 rpm, 2.0±0.002 g of water-absorbent resin particles were rapidly added to the beaker. A stopwatch was used to measure the time (sec) from addition of the water-absorbent resin particles until convergence of the vortex on the liquid surface. The time was recorded as the water absorption rate of the water-absorbent resin particles.

Figure 1:
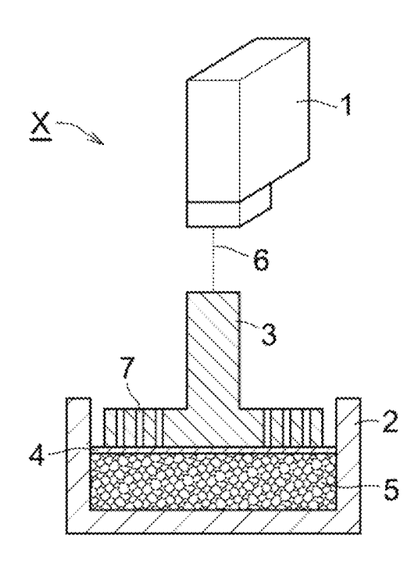
The drawing is a schematic illustration of the measurement device used to measure the swelling height of the water-absorbent resin of the present invention with respect to 3.3 mass % salt water (salt water swelling height).

Method for Measuring Salt Water Swelling Height H of Water-Absorbent Resin particles The salt water swelling height H one minute after the start of water absorption was measured using a swelling height measurement apparatus. The drawing is a schematic diagram of the swelling height measurement apparatus. The swelling height measurement apparatus X shown in the drawing includes a movement distance measuring apparatus 1, a concave circular cup 2 (30 mm in inside height, 80.5 mm in inside diameter), a plastic convex circular cylinder 3 (80 mm in outside diameter; 60 through-holes 7 with a diameter of 2 mm are uniformly formed on the surface in contact with the water-absorbent resin particles), and a nonwoven fabric 4 (a spunbond nonwoven fabric with a thickness of 0.1 mm and a basis weight of 10 g/m2). The swelling height measurement apparatus X is configured to measure a change in movement distance in 0.01 mm increments using a laser beam 6. The concave circular cup 2 is configured to uniformly disperse a predetermined amount of water-absorbent resin particles. The convex circular cylinder 3 is configured to uniformly apply a load of 90 g to water-absorbent resin particles 5.

0.5 g of a sample (water-absorbent resin 5) was uniformly sprayed over the concave circular cup 2, and nonwoven fabric 4 was spread thereon. The plastic convex circular cylinder 3 was gently placed on the nonwoven fabric 4 and arranged so that the laser beam 6 of the sensor of the movement distance measuring apparatus 1 could illuminate the center portion of the cylinder 3.55 g of 3.3 mass % salt water previously adjusted to 20° C. was poured into the concave circular cup 2 over a period of about 10 seconds to the extent that the salt water did not overflow from the concave circular cup 2. The movement degree of the convex circular cylinder 3 pushed up due to swelling of the water-absorbent resin particles 5 was measured. The movement degree of the convex circular cylinder 3 one minute after the moment of the start of water absorption by the water-absorbent resin particles (more precisely, the moment when the cylinder 3 was pushed up by 0.5 mm upon absorption of a trace of salt water by the water-absorbent resin particles) (including the height to which the cylinder 3 was pushed up (0.5 mm) at the moment of the start of water absorption) was recorded as "the salt water swelling height H."

TABLE 1

| Examples/ Comparative Examples | Production Conditions | | Evaluation results | | |
|---|---|---|---|---|---|
| | Amount of post-crosslinking agent used (mmol*) | Water content (%) | Amount of salt water absorbed (g/g) | Salt water absorption rate (sec) | Salt water swelling height H (mm/0.5 g) |
| Example 1 | 0.46 | 19.5 | 56 | 2 | 4.6 |
| Example 2 | 0.62 | 20.5 | 53 | 3 | 4.4 |
| Example 3 | 0.46 | 23.3 | 49 | 3 | 4.3 |

TABLE 1-continued

| Examples/ Comparative Examples | Production Conditions | | Evaluation results | | |
|---|---|---|---|---|---|
| | Amount of post-crosslinking agent used (mmol*) | Water content (%) | Amount of salt water absorbed (g/g) | Salt water absorption rate (sec) | Salt water swelling height H (mm/0.5 g) |
| Example 4 | 0.46 | 18.0 | 53 | 5 | 4.3 |
| Comp. Ex. 1 | 0.31 | 28.9 | 40 | 4 | 3.2 |
| Comp. Ex. 2 | 0.21 | 22.3 | 53 | 4 | 3.1 |
| Comp. Ex. 3 | 0.46 | 11.4 | 58 | 7 | 3.3 |
| Comp. Ex. 4 | 0.49 | 16.0 | 42 | 100 | 1.0 |
| Comp. Ex. 5 | 0.52 | 23.5 | 41 | 102 | 1.6 |

*in terms of the amount used per mole of the total amount of the monomer components)

Table 1 shows the values of salt water absorption (g/g), salt water absorption rate (sec), and salt water swelling height H (mm/0.5 g) of the water-absorbent resins obtained in the Examples and Comparative Examples. Table 1 further shows the amount of post-crosslinking agent used to produce the water-absorbent resin, and the water content after the drying treatment.

Table 1 shows that the water-absorbent resins obtained in Examples 1 to 4 all had a salt water swelling height H of 3.5 mm/0.5 g or higher. This indicates that the water-absorbent resins had a high salt water absorption capacity (g/g) and a high salt water absorption rate (sec).

In contrast, in Comparative Examples 1 to 3 and 5, the amount of post-crosslinking agent used and the water content were both out of the appropriate ranges. Therefore, the salt water swelling height H was below 3.5 mm/0.5 g, and the desired water-absorption performance could not be achieved. Further, the water-absorbent resin of Comparative Example 4 was not granular, but almost spherical; therefore, the desired water absorption performance could not be obtained.

The invention claimed is:

1. A water-absorbent resin comprising a partially neutralized polyacrylic acid having a crosslinked structure,
    the partially neutralized polyacrylic acid having a structure crosslinked by a post-crosslinking agent, and
    the water-absorbent resin having a swelling height of 4.3 mm/0.5 g or more with respect to 3.3 mass % salt water, as determined under the following measurement conditions:
    0.5 g of water absorbent resin particles are sprayed over a circular concave cup having a height of 30 mm and an inner diameter of 80.5 mm; a nonwoven fabric is spread thereon; a circular convex cylinder having an outer diameter of 80 mm is placed on the nonwoven fabric; and 55 g of 3.3 mass % salt water at 20° C. is poured into the circular concave cup; one minute after the start of water absorption by the water-absorbent resin particles, the degree that the circular convex cylinder is pushed up due to swelling of the water absorbent resin particles is measured as a salt water swelling height of the water absorbent resin.

2. A water-blocking material comprising the water-absorbent resin of claim 1.

3. A method for producing a water-absorbent resin, comprising:
    step 1 of subjecting a monomer component containing acrylic acid and a salt thereof to reversed-phase suspension polymerization, and then drying the resulting polymer to obtain a partially neutralized polyacrylic acid; and
    step 2 of mixing the polyacrylic acid with a post-crosslinking agent to post-crosslink the polyacrylic acid,
    wherein in step 1, the drying is performed so that the polyacrylic acid has a water content of 18 to 30 mass %; and
    in step 2, the post-crosslinking agent is used in an amount of 0.20 mmol or more per mole of the total amount of the monomer component.

* * * * *